(12) United States Patent
Lakdawala et al.

(10) Patent No.: US 8,764,910 B2
(45) Date of Patent: Jul. 1, 2014

(54) METHOD AND A WASHING SYSTEM FOR WASHING TURBINES

(76) Inventors: Ness Lakdawala, St-Lambert (CA); Adel Homsy, Montréal (CA); Nerses Agopian, St-Laurent (CA)

(*) Notice: Subject to any disclaimer, the term of this patent is extended or adjusted under 35 U.S.C. 154(b) by 240 days.

(21) Appl. No.: 11/218,543

(22) Filed: Sep. 6, 2005

(65) Prior Publication Data

US 2006/0060233 A1 Mar. 23, 2006

Related U.S. Application Data

(63) Continuation-in-part of application No. 10/943,247, filed on Sep. 17, 2004, now abandoned.

(51) Int. Cl.
*B08B 9/00* (2006.01)

(52) U.S. Cl.
USPC ...................................... 134/166 R

(58) Field of Classification Search
USPC ......................................... 134/94.1
See application file for complete search history.

(56) References Cited

U.S. PATENT DOCUMENTS

| | | | | |
|---|---|---|---|---|
| 5,259,203 A | * | 11/1993 | Engel et al. ..................... | 62/150 |
| 5,732,562 A | * | 3/1998 | Moratalla ........................ | 62/94 |
| 5,845,505 A | * | 12/1998 | Galus et al. ..................... | 62/95 |
| 5,867,977 A | * | 2/1999 | Zachary et al. ................. | 60/39.53 |
| 6,109,044 A | * | 8/2000 | Porter et al. .................... | 62/96 |
| 6,182,453 B1 | * | 2/2001 | Forsberg ......................... | 62/125 |
| 6,588,226 B1 | * | 7/2003 | Semrow et al. ................. | 62/291 |
| 6,745,903 B2 | * | 6/2004 | Grandics ......................... | 210/501 |
| 2002/0096197 A1 | * | 7/2002 | Ackerman et al. ............. | 134/22.18 |
| 2003/0094011 A1 | * | 5/2003 | Zakryk et al. .................. | 62/291 |

* cited by examiner

*Primary Examiner* — David Cormier
(74) *Attorney, Agent, or Firm* — Muncy, Geissler, Olds & Lowe, P.C.

(57) ABSTRACT

A turbine washing system having a water making apparatus at a turbine site having a turbine. The water making apparatus extracts water from air. A water delivery system delivers the extracted water from the water making apparatus to the turbine to clean the blades of the turbine while the turbine is on-line. A water feeder is provided for feeding the extracted water from the water making apparatus to the water delivery system.

A method for cleaning turbines on-line comprises extracting water from air directly at a turbine site having a turbine and treating the air and the extracted water to obtain extremely clean water having a conductivity of less than 3. This extremely clean water is then fed to the turbine to clean the turbine blades while the turbine is on-line. Preferably the extremely clean water is fed through a deionizer before being fed to the turbine.

18 Claims, 2 Drawing Sheets

METHOD AND A WASHING SYSTEM FOR WASHING TURBINES

RELATED APPLICATIONS

This application is a continuation-in-part of application Ser. No. 10/943,247 filed Sep. 17, 2004.

BACKGROUND OF THE INVENTION

1. Field of the Invention

This invention is directed toward a washing system for washing turbines on-line. The invention is also directed toward a method for washing turbines on-line.

2. Description of the Related Art

Turbines lose their efficiency when the turbine blades become dirty during use and production is lost. The aerodynamic efficiency of the blades is reduced as a dirt film forms on the blades. It is known to wash the blades to remove the film to maintain their efficiency. The washing usually occurs when the turbine is off-line. The turbine is filled with washing liquid, including detergents, when off-line and is rotated at 'crank' speed. The turbine is rotated long enough to allow the turbine blades a good long soak in the washing liquid thus allowing better cleaning. Production is of course lost while the turbine is off-line.

It is known to clean turbines on-line by spraying washing liquid onto the blades to maintain efficiency at peak levels on-line cleaning is more cost efficient than off-line cleaning since there is no down-time for the turbine. However, the washing liquid normally employs a detergent or cleaning compound to remove the dirt, and the detergent or cleaning compound could present an environmental problem. The detergent or cleaning compound used in the washing liquid could also leave a film or coating on the blades after cleaning thereby affecting turbine efficiency. Therefore on-line turbine cleaning with a detergent usually still needs to be supplemented with the off-line cleaning, but not as frequently as when only off-line cleaning is used.

The water usually employed in the washing liquid in turbine cleaning is not very clean. The water normally has minerals in it which could foul the blades being cleaned. The water normally used can also have some suspended solids and/or other impurities therein which can lead to a fine coating or film being left on the blades being cleaned and which also could damage the surface of the blades.

Clean water can be produced for use in turbine cleaning by reverse osmosis or by desalinization systems. It has been found that spraying clean water only, without detergent or cleaning compounds, on the turbine blades, while the turbine is on-line, can help clean the blades and thus extend the time between off-line cleanings. However the water obtained by reverse osmosis is relatively expensive since the filtering membrane used in the reverse osmosis systems must be frequently changed. Desalinization systems also produce relatively expensive water. The water obtained from both systems also is still not clean enough to effectively and efficiently clean the turbines. Water produced by the reverse osmosis process, for example has a conductivity of about 4 microsiemens/cm and a total dissolved solids (TDS) count of about 3 ppm or more and this amount of solids and impurities in the water could cause some damage to the blades being cleaned and can also still leave a fine film coating on the blades affecting their efficiency.

Turbines are often used in remote locations, away from water distribution networks, where it is difficult to provide a sufficient supply of clean, inexpensive, cleaning water. Turbines are used to provide power, for example, in gas or oil fields in hot, arid regions that are water poor. Providing any source of water to clean the turbines in these locations can be very costly. Relatively clean water can be provided by desalinization, if the turbines are located close to salt water, or by transporting water in to the turbines from locations where water is more abundant, the water being treated by reverse osmosis before or after transport. However, these methods of providing water are obviously very costly and also, as noted above, do not provide very clean water for use in on-line turbine cleaning.

SUMMARY OF THE INVENTION

It is the purpose of the present invention to provide a method and apparatus to efficiently and effectively clean turbines while the turbines are on-line. It is another purpose of the present invention to provide a method, and a turbine washing system, to efficiently and effectively clean turbines, while the turbines are on-line, even in water poor locations. It is a more particular purpose of the present invention to provide a method, and a turbine washing system, for cleaning turbines on-line using water taken out of the air at the turbine site. It is another purpose of the present invention to provide a turbine washing system that employs relatively cheap, extremely clean, or even ultra clean, wash water to effectively and efficiently clean the turbine blades without damaging them.

The turbine washing system of the present invention uses a self contained water making apparatus which condenses water out of the air, even dry desert air, right at the turbine site and treats both the air, from which the water is distilled, and the water obtained from the air, to provide extremely clean water for the washing system. In the present invention extremely clean water is defined as water having a conductivity of under 3.0 microsiemens/cm, conductivity being a measure of all the particles and impurities (chemicals, microbials, etc.) in the water, since the water is obtained at the turbine site from the air, the water is very cheap to use since no transport of water to the site is involved. Also, since the water is obtained from the water vapor in air, the water is relatively clean to begin with the water vapor having evaporated from surface water leaving particles and impurities behind. The water vapor picks up some impurities from the air but it normally does not get as dirty as surface water. The cleaner the water condensed from the air is to start with, before treatment, the cleaner the water is after treatment.

The extremely clean water obtained from the air can be used directly to wash turbines on-line. Preferably however, the extremely clean water is deionized just before use to provide ultra clean water. Ultra clean water in the present invention is defined as water having a conductivity under 1.0 microsiemens/cm. The ultra clean water is very reactive and thus can easily clean the film off the turbine blades. No detergents or cleaning compounds are needed to help clean the blades thus reducing cost. The water making apparatus also has the advantage of providing potable water at remote, water deficient, turbine locations.

Water making apparatus for distilling water from air are well known but these known apparatus are usually used to make potable water. The potable water obtained is normally clean and drinkable at a conductivity of around 4 microsiemens/cm or even slightly higher and therefore it need not be treated to provide extremely clean water with a conductivity of less than 3 microsiemens/cm. Nor is the water obtained deionized since it is best that the water, for drinking purposes, retains whatever minerals it carries. Drinking deionized water would cause the water to remove minerals from the body of the person drinking the water leading to health problems. The known water making apparatus are also usually designed for operation in generally ideal conditions and are not designed to be able to efficiently provide a sufficient supply of water in extreme temperature and humidity conditions such as in the desert.

In accordance with one aspect of the present invention there is provided an on-line turbine washing system having a water making apparatus at the turbine site for providing extremely clean water from water taken out of the air. The washing system has water feeding means that feeds the extremely clean water to a water delivery system that delivers the water to the blades of a turbine while the turbine is operating normally.

The water making apparatus has air filtering and purifying means to filter and purify the air entering the water making system. The water making apparatus also has condensing means to condense or extract water out of the filtered and purified air, even when the air is hot and dry. The apparatus further includes filtering and purifying means to filter and purify the extracted water to provide extremely clean water to the water feeding means. The extremely clean water can be delivered directly to the water delivery system as made. Preferably however, storage means are provided to store the extremely clean extracted water until needed. Purifying means in the storage means maintain the extracted water extremely clean during storage. The water in the storage means can also be circulated continuously, or at selected times for selected intervals, to help keep it extremely clean. The temperature of the water in the storage means can also be modulated to deliver the water at the desired optimum temperature.

The extremely clean water has been found to be able to clean the blades of the turbines on-line leaving little or no film on the blades, and thus, at the worst, extending the time required between off-line cleanings, and at the best, eliminating the off-line cleanings. As a result, the turbines need not be shut down as often, or at all, for cleaning and production efficiency is thus increased.

The water making apparatus also preferably includes deionizing means to remove active mineral ions from the water as it is delivered either directly, or from the storage means, to the water delivery system. The deionizing means takes extremely clean water, having a conductivity of under 3, and provides ultra clean water, having a conductivity of under 1, to the water delivery system. The ultra clean water leaches off the film and/or deposits accumulated on the blades provided that the blades are cleaned frequently. It is has been found that a short cleaning each day, for example, with the ultra clean water is sufficient to keep the blades clean. No detergents or other cleaning compounds are needed and no off-line cleaning to supplement the on-line cleaning is needed.

The water delivery system, which is known, includes nozzle means for spraying either the extremely clean water, or the ultra clean water from the deionizing means, directly on the blades of a turbine while the turbine is operating on-line. The turbine cleaning system has control means which can be used to clean turbines on-line on a regular programmed schedule.

Also in accordance with the present invention there is provided a method for cleaning turbines which comprises filtering and purifying air at the turbine site, extracting water from the cleaned and purified air at the site, and cleaning and purifying the extracted water to provide extremely clean water. The extremely clean water obtained can be directly used to clean a turbine on-line at the turbine site. Preferably, the extremely clean water is deionized to provide ultra clean water to clean a turbine on-line at the turbine site. The extremely clean water can be stored at the site when the water is needed for cleaning a turbine on-line at the site, it is passed from storage directly to clean the turbine on-line or passed from storage through a deionizer to provide ultra clean water to clean the turbine on-line.

The invention is particularly directed toward a turbine washing system having a water making apparatus at a turbine site for providing extremely clean water from air and a water delivery system for delivering the extremely clean water to clean the blades of the turbine at the turbine site while the turbine is on-line. The system includes water feeding means for feeding the extremely clean water from the apparatus to the water delivery system.

The invention is also particularly directed toward a method for cleaning turbines comprising providing extremely clean water, deionizing the extremely water to provide ultra clean water having a conductivity of less than 1 microsiemens/cm, and delivering the ultra clean water to a turbine to clean the turbine blades while the turbine is running.

The invention is further particularly directed toward a method for cleaning turbines comprising extracting water from air directly at a turbine site having a turbine and treating the air and the extracted water to obtain extremely clean water having a conductivity of less than 3 microsiemens/cm. The extremely clean water is fed to the turbine at the site to clean the turbine blades while the turbine is on-line. The method can include the step of passing the extremely clean water through a deionizer to obtain ultra clean water having a conductivity of less than 1 microsiemens/cm and feeding the ultra clean water to the turbine to clean the turbine blades while the turbine is on-line.

DESCRIPTION OF THE PREFERRED EMBODIMENTS

Figure 1:
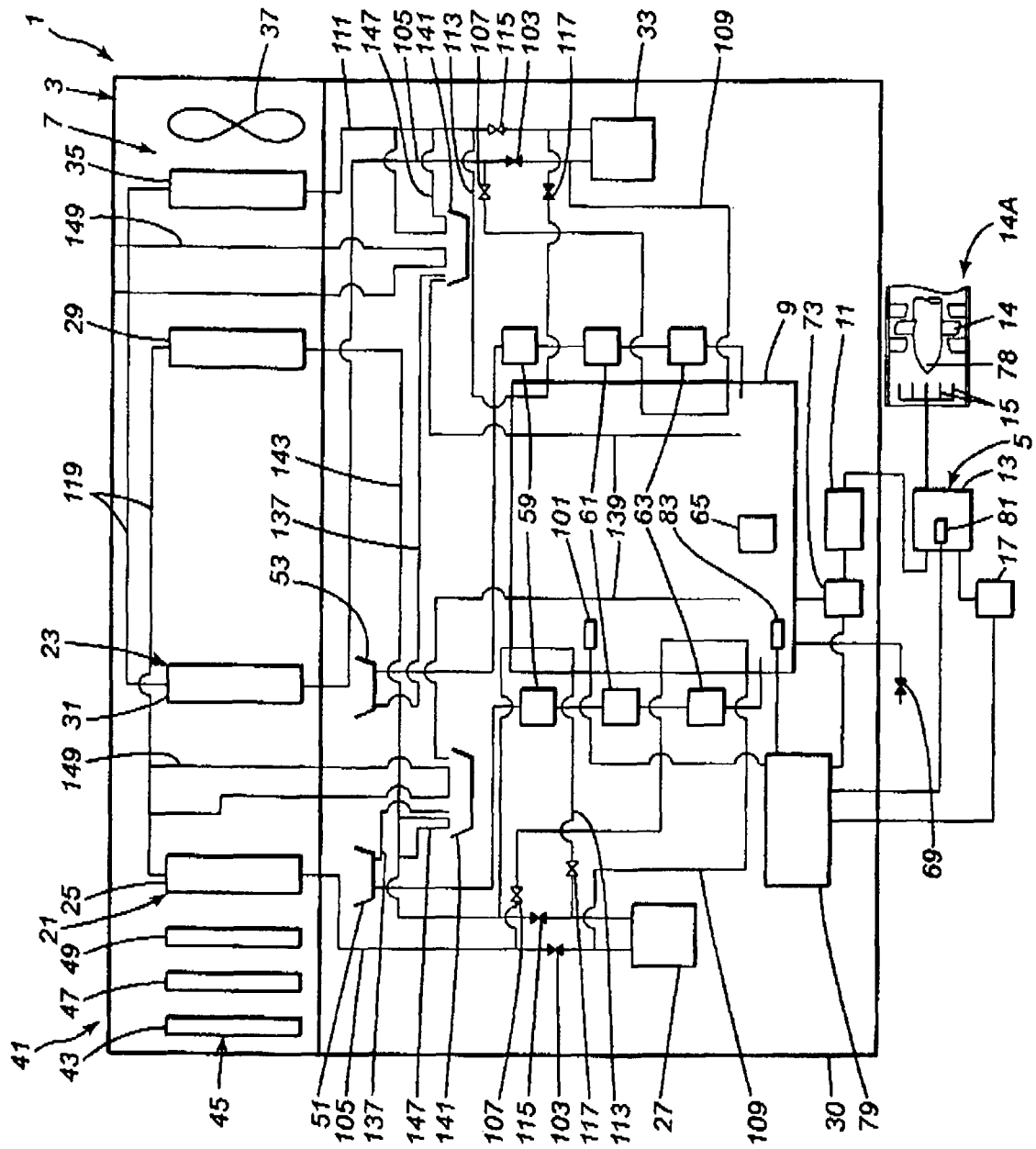
FIG. 1 is a schematic illustration of the turbine washing system.

The turbine washing system 1, as shown in FIG. 1, comprises a water making apparatus 3 coupled to a water delivery system 5. The water making system 3 extracts water from air passing through a duct 7 and stores the water taken out of the air in the duct 7 in a holding tank 9. The water is fed as required from the holding tank 9 to the water delivery system 5 through a deionizer 11. The water delivery system 5 has a wash tank 13 for receiving the water from the holding tank 9. The delivery system sprays the deionized water from the wash tank 13, onto the blades 14 of an operating turbine 14a through a system of nozzles 15. The water is sprayed from the nozzles 15 by building up air pressure in the wash tank 13 via an air pump 17. A water pump could be used in place of the air pump.

The water making apparatus 3, in its basic form as shown in FIG. 1, has first and second water extracting systems 21, 23. The first water extracting system 21 has a first evaporator 25 in the air duct 7 connected to a first compressor 27 and a first condenser 29. The condenser 29 is also located in the air duct 7 while the compressor 27 is located outside the duct 7 in an enclosure 30. The second water extracting system 23, separate from the first, has a second evaporator 31 in the air duct 7, located behind the first evaporator 25, the second evaporator 31 connected to a second compressor 33 outside the duct 7 and a second condenser 35 located inside the duct 7. In some cases the condensers 29, 35 could also be located in the enclosure 30 instead of the air duct 7. The condensers could be air or water cooled depending on where they are located. A fan 37 in the duct 7, located behind the first and second evaporators 25, 31 and the condensers 29, 35 draws air through the duct and past the evaporators and condensers. The fan 37 could also be located in front of the evaporators and condensers to push air through the duct 7.

Having the two evaporators 25, 31, one behind the other in the duct, provides an efficient system for extracting water from the air when the ambient air temperature is hot, generally between about ninety and one hundred and ten degrees Fahrenheit and the relative humidity is low, the first evaporator 25 will cool the incoming air in the duct 7 so that the second evaporator 31 can condense water from the cooled air. If the relative humidity is high as well, even the first evaporator 25 will condense water from the air. If the ambient air temperature is temperate, generally between about sixty five and ninety degrees Fahrenheit, both evaporators will condense water from the air when the ambient air temperature is cool, generally between forty five and sixty five degrees Fahrenheit, the first evaporator will condense water from the air while the second evaporator would freeze the remaining water in the air. If the temperature is in the low range of cool or low ambient air temperature, only the first evaporator may be operated, operation of the second evaporator becoming too inefficient. The water making apparatus is put in a defrost mode to melt and collect the frozen water off the second evaporator, the first evaporator not operating during defrosting. The defrost cycle stops once all the ice is melted.

The apparatus 3 has been shown as one integral unit with the duct 7 adjacent the enclosure 30. However, the duct 7 could be a separate unit from the enclosure 30 which could simplify shipping since the apparatus 3 can be quite large. On site, the duct 7 could be spaced from the enclosure 30 to facilitate installation, the duct 7 and enclosure 30 connected by piping.

The water making apparatus 3 includes air filtering and purifying means 41 at the entrance to the duct 7 to remove particles and other impurities which might contaminate the water being collected. The air filtering and purifying means 41 can include an air particle filter 43 to remove particles from the air. The air particle filter 43 can be a mechanical filter such as a screen or series of screens located in the entrance 45 to the duct 7. Alternatively, the air particle filter 43 can be an electrostatic filter other types of mechanical, particle filters can be used. The air filtering and purifying means 41 can have biological purifying means such as a known ultra-violet (UV) light source 47 for removing microbials from the air which could contaminate the water. The air filtering and purifying means 41 can also employ a UV light 49 with a photo catalyst material such as titanium dioxide to destroy airborne molecular contaminants. The air filtering and purifying means could further include chemically treated media (not shown) such as granules for the sorption and/or chemisorption of volatile organic components (VOC) from the air.

Water collector pans 51, 53 are located below the evaporators 25, 31 respectively to collect the water that is condensed out of the air by the evaporators. The water is collected, filtered and purified to remove further impurities, and directed to the holding tank 9 from the pans 51, 53. The water filtering and purifying means can comprise a sediment filter 59 for filtering particles and sediment out of the water; an activated carbon filter 61 capable of removing chemicals, organic contaminants and heavy metal compounds, and an UV light 63 for eliminating microbials. The holding tank 9 can also contain purifying means such as known microbe destroying means 65. The microbe destroying means 65 can be an UV light within the tank to prevent the growth of microbes in the water held in the tank 9. The water collector pans 51, 53; the holding tank 9; and the evaporators 25, 31 are made from stainless steel or a stable plastic with no minerals in it to maintain the water clean.

The above water making apparatus provides extremely clean water. The water in the holding tank 9 has a conductivity of less than 3 microsiemens/cm and is normally close to 2 microsiemens/cm, and has a total dissolved solids (TDS) count well under 3 ppm. Extremely clean water can be obtained which has a conductivity close to 1 microsiemens/cm which is a preferred value.

From the holding tank 9 the water is passed, as needed, through deionizing means 11, for removing active mineral ions from the water, and then to the water delivery system 5 to provide the ultra clean water needed for turbine washing. The water emerging from the deionizer has a conductivity of less than 1 microsiemens/cm. Ultra clean water can be obtained from the deionizer which has a conductivity close to 0.2 microsiemens/cm which is a preferred value. The deionizing means 11 contains an ion exchange resin for removing the active mineral ions from the water. A suitable resin is one sold under the trade name u-01503-30 by Labcor Ventes Techniques Inc. of Anjou, Quebec.

The deionizing means 11 is located at the outlet of the holding tank 9 for several reasons. If potable water is taken from the holding tank 9 through a drinking water outlet 69, the water used should not be demineralized since demineralized water would remove minerals from the body of the person drinking it. Further, even if potable water were not taken from the holding tank, demineralizing the water on entering the holding tank could cause the water to pick up minerals from the holding tank material if it is metallic and this water would then not be clean enough to clean the turbine blades. Thus, where the water is demineralized is important to the system.

The water delivery system 5 has a wash water holding tank 13. Water is delivered from the holding tank 9 to the wash tank 13 by water feeding means such as a pump 73. The water feeding means could comprise a gravity water feed instead of a pump if the holding tank 9 is above the wash tank 13. The wash tank 13 is made of stainless steel or a stable plastic to maintain the water deionized. Nozzles 15 are arranged in relation to the blades 14 on a turbine rotor 78 to wash the surfaces of the blades as is known in the art. The water is delivered from the wash tank 13 to the nozzles 15 by operating the air pump 17 to build up pressure in the wash tank 13 as required.

A controller 79 connected to the pump 17 can be programmed to deliver specific amounts of wash water to the blades at pre-determined times. The controller 79 can be connected to a level sensor 81 in the wash tank 13 to ensure that there is a sufficient amount of water present before starting the washing cycle. If there is sufficient water in the wash tank 13 the pump 17 is actuated to build pressure in the tank and when the pressure is sufficient the wash line is opened by a solenoid (not shown) to send the wash water under pressure to the nozzles. After a predetermined time the wash line is closed. The pump 17 can be used to purge the wash line and the water tank after the wash water has been delivered.

If sufficient water is not present in the wash tank for a wash cycle, the controller 79 can operate the pump 73 to deliver more water from the holding tank 9. A level sensor 83 in the holding tank 9 will determine how much water can be delivered when needed. If there is not sufficient water in the system when a wash is required that washing cycle is omitted by the controller. When the level sensor 83 senses that the water is low in the holding tank, the controller will automatically start to make more water by starting the water making apparatus including the compressors and the fan.

A sensor can be provided for checking the cleanliness of the water emerging from the holding tank to the wash tank. The sensor can, for example, measure the conductivity of the water and if the conductivity measured is above a certain value, that shows that the water has a conductivity of more than 1.0 microsiemens/cm for example, the controller will automatically stop the system. The various air and water filters and purifiers can be checked to see which, if any, are malfunctioning or need replacement. One of the advantages of the apparatus is that the water delivered is extremely clean. One of the reasons the water is extremely clean is that the apparatus, from start to finish; is essentially a closed system with the water arriving at the wash tank through a line from the holding tank which is itself closed.

Figure 2:
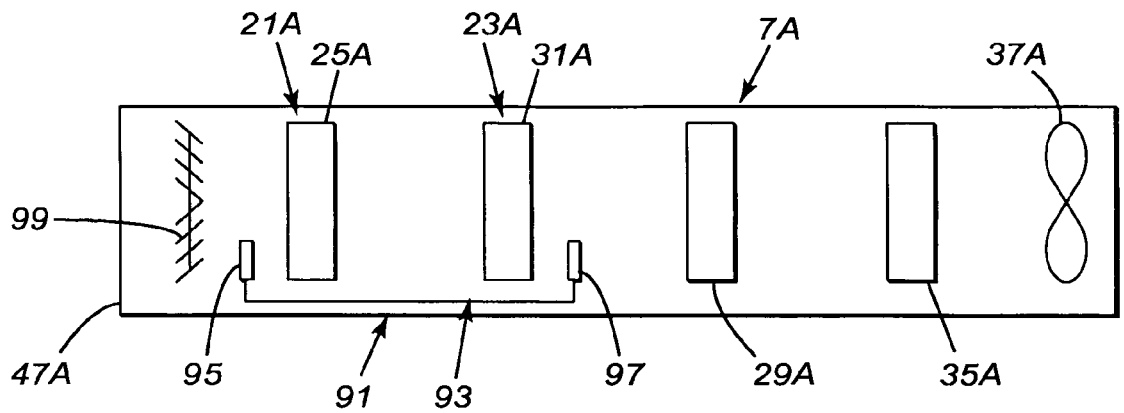
FIG. 2 is a schematic illustration of a water making apparatus using a heat pipe.

The system described above directs the extremely clean water obtained from water filter and purifying means to a holding tank 9 and then from the holding tank to the washing system through a deionizing means. However, the system could be modified to be used in other ways. For example, the extremely clean water obtained from the water filter and purifying means could be sent directly to the washing system for on-line turbine cleaning without being stored or without deionization. This extremely clean water can be used to clean the turbine blades without the use of detergents or other cleaning compounds. Off-line cleaning may still be required at intervals to supplement the on-line cleaning with the extremely clean water. Alternatively, the extremely clean water could be stored in the holding tank and provided from the tank as needed to the washing system, by-passing the deionizer. In another alternative, the extremely clean water being sent directly to the washing system, by-passing storage, can be deionized to directly provide ultra clean water which will provide better cleaning, will not require detergents and other cleaning compounds, and will not require off-line cleaning The use of two water extracting systems 21, 23 provides for efficient water removal from the air, particularly when working with low humidity air. For use in high, dry bulb air temperature conditions, the water making apparatus 3A, as shown in FIG. 2 can include a third water extracting system 91 in the form of a heat pipe 93 with the chilling end 95 of the heat pipe 93 located in front of the first evaporator 25A and the heating end 97 of the heat pipe 93 located behind the second evaporator 31A. The chilling end 95 of the heat pipe 93 will pre-cool the hot air entering the air duct 7A, drawn in by the fan 37A, so that the first and second evaporators 25A, 31A will operate more efficiently in removing water from the entering air. The compressors will also operate more efficiently. The heating end 97 of the heat pipe will heat the exiting air which does not effect the water making apparatus.

At least one of the condensers 29A, 35A employed in one of the water extracting systems 21A, 23A could be located directly behind the heating end 97 of the heat pipe 93 to heat the refrigerant in the associated condenser and thus make the water extracting system more efficient. It should be noted that the heat pipe, on its own, is not a 'water extracting system'. However, for this application, since the heat pipe helps in the overall removal of water from the air, it will designated as a third water extracting system. The primary purpose in using the heat pipe arrangement however is to improve the efficiency of the compressors since they do not have to work as hard to cool the air. Alternatively, the use of the heat pipe permits the use of smaller compressors.

The use of the heat pipe 93 makes the apparatus very efficient in distilling water from hot, dry air as in a desert location. The air in the desert can enter the water making apparatus 3A at a temperature of one hundred and ten degrees Fahrenheit or even greater. The chilling end 95 of the heat pipe 93 could initially cool this air to around ninety degrees Fahrenheit. The first evaporator 25A would then further cool the air to around seventy degrees Fahrenheit and this air entering the second evaporator 31A would be cooled enough to condense water out of the air. The air is cooled by the second vaporator 31A to around fifty degrees Fahrenheit and then, when passed through the heating end 97 of the heat pipe, would be heated to about seventy degrees Fahrenheit before emerging into out of the duct 7A.

The air duct 7A can be provided with baffles 99 adjacent its entrance 47A for selectively directing at least some of the entering air over the heat pipe 93 if needed. The baffles 99 can be operated to selectively direct at least some of the entering air over the chilling end 95 of the heat pipe 93 so as to improve the efficiency of the apparatus in removing water from hot, dry air. If working with air having a relatively normal ambient temperature, the heat pipe is not employed and no air is directed by the baffles 99 over the chilling end of the heat pipe.

The system can include means for controlling the temperature of the water in the holding tank 9 water in the holding tank 9 can be cooled by passing the refrigerant from at least one of the evaporators 25, 31 through the holding tank 9 to thereby cool the water held in the tank. The water in the holding tank 9 can also be heated by passing refrigerant from at least one of the compressors 27, 33, or even from at least one of the condensers 29, 35 through the holding tank. This avoids the need for a separate refrigerant compressor system to cool the water or the need for a separate water heater in the tank to heat the water. The passing of the refrigerant through the holding tank 9 to cool or heat the water therein can be controlled by the temperature of the water in the holding tank if for example it is desired to provide cool water from the holding tank for drinking and a temperature sensor 101 in the tank senses the water temperature to be above the desired cool temperature, the controller 79 could be programmed to close one valve 103 in the liquid refrigerant return line 105 from the evaporator 25 to the compressor 27 and to open another valve 107 in a return by-pass cooling line 109 thus passing the returning cool refrigerant through the holding tank 9 before returning it to the compressors 27. A similar return by-pass cooling line 109 with associated valves can be used with the second evaporator 31.

If, instead, it is desired to provide warm or even hot water from the holding tank 9 to wash turbines, the water in the holding tank 9 can be heated by directing hot refrigerant, passing via a feed line 111 from the compressor 27 to the condenser 29, through the holding tank via a by-pass heating line 113 and associated valves 115, 117 located in the feed and heating lines 111, 113 respectively. The opening and closing of the valves 115, 117 is controlled by the water temperature sensor 101 in the tank 9 and the controller 79. A similar by-pass heating line 113 can be used in conjunction with the second compressor 33 with associated valves 115, 117 while the by-pass heating lines 113 have been located in the feed lines 111 from the compressor 27 to the condenser 29, the lines could also be located in the feed lines 119 passing from the condensers 29, 35 to the evaporators 25, 31.

Figure 3:
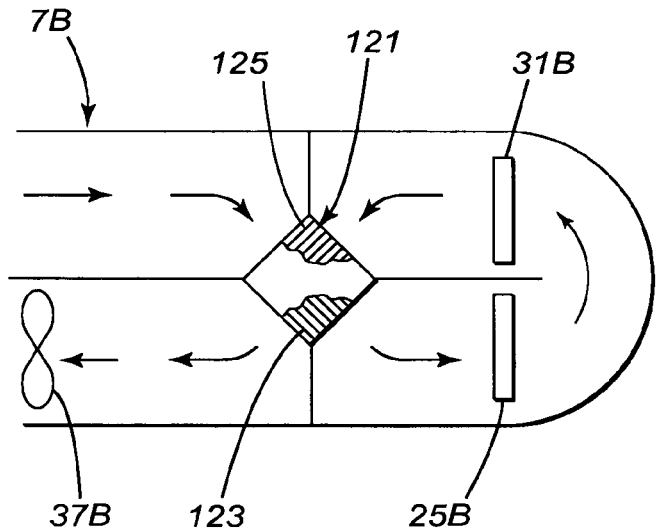
FIG. 3 is a schematic illustration of a water making apparatus using a cross-flow heat exchanger.

The water making apparatus can employ heat exchangers in the air duct to lower the temperature of the air before the air enters the first and second evaporators in order to make the system more efficient. As shown in FIG. 3 the duct 7B has a cross flow, air-to-air heat exchanger 121 mounted therein in front of the first and second evaporators 25B, 31B. Air, drawn in by the fan 37B, passes through the heat exchanger 121 in one direction in one set of ducts 123, this air then entering the first and second evaporators 25B, 31B. The cooler air emerging from the first and second evaporators 25B, 31B is passed through the heat exchanger 121 in cross direction, in another set of ducts 125, to the entering air flow in the first set of ducts 123. The cooler air from the first and second evaporators 25B, 31B pre-cools the entering air in the heat exchanger 121 allowing more water to be extracted by the first and second evaporators 25B, 31B making the system more efficient.

Figure 4:
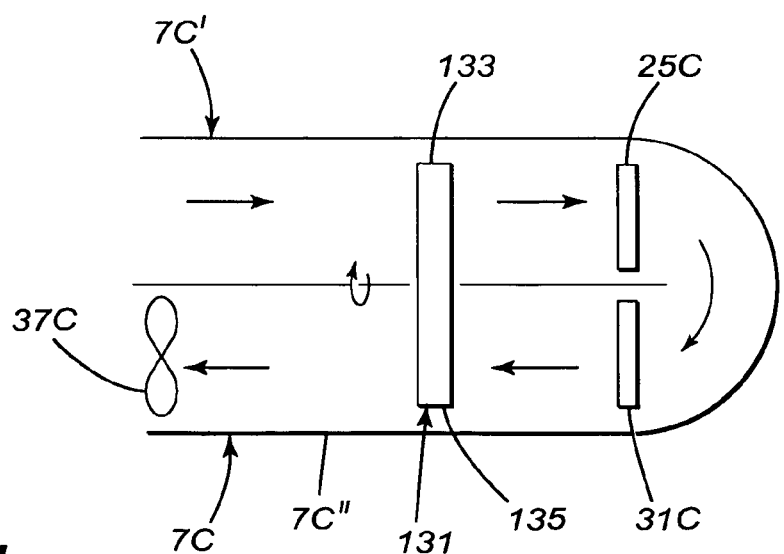
FIG. 4 is a schematic illustration of a water making apparatus using a heat exchange wheel.

Alternatively a heat exchange wheel can be used in the duct in place of the cross-flow heat exchanger. As shown in FIG. 4, the air duct 7C has a first section 7C' moving the air in one direction and a second section 7C", serially connected to the first section 7C' and adjacent to it but moving the air in the opposite direction. A rotary heat exchange wheel 131 is mounted in the duct 7C with a first half 133 of the wheel 131 in the first section 7C' of the air duct and with the second half 135 of the wheel 131 in the second section 7C" of the air duct. The air, drawn in by fan 37C, enters the first half 133 of the wheel 131 and is precooled by the heat exchanger before it enters the first and second evaporators 25C, 31C. The cooled air emerging from the first and second evaporators 25C, 31C is passed through the second half 135 of the rotating heat exchange wheel 131 in the second section 7C" of the duct to cool the wheel before it enters the first section 7C' of the duct.

Any extra water produced by the water making apparatus 3, over and above that needed for turbine washing and for drinking may be used to conserve energy used by the system. This can be done by directing the excess water from the collectors 51, 53 or the holding tank 9, via lines 137, 139 into water troughs 141. The hot gas discharge lines 111 from the compressors 27, 33, and the warm liquid discharge lines 119 from the condensers 29, 35 may be by-passed, using suitable valving (not shown), through the troughs 141 by by-pass lines 147, 149 to cause the excess water in the troughs to evaporate. The cooling of the hot gas and warm liquid refrigerant through this evaporation of the excess water provides a lower head pressure and sub-cooled liquid in the cooling systems thereby reducing energy requirements for the system.

The controller 79 for the washing system can be programmed to have the water delivery system deliver water in predetermined amounts at predetermined times. For example, the washing system can be programmed to wash each turbine on-line once a day, the washing taking about ten minutes each day. This program, using ultra clean water, has been found to keep the turbine blades clean without requiring supplemental off-line washing. Similar results could be obtained, for example, by washing the turbines on-line every second day for twenty minutes. The washing time can, of course, vary depending on the size of the turbine and the amount of water used.

The wash tank 13 is pressurized by the controller for water delivery and depressurized when it is to be filled. The controller will also purge the water delivery system from the wash tank to the nozzles before and after each cleaning operation, cleaning and clearing the lines and nozzles of any water that remained in the lines from the previous cleaning. The controller will automatically go through the wash cycle, but a manual override exists to operate the system manually if needed.

The water making apparatus preferably has the enclosure 30 containing the compressors and the holding tank made explosion proof so that the washing system is safe when used in classified environments. The enclosure can be pressurized to prevent the entry of explosive gases into the enclosure. An access door in the enclosure, providing access to various components of the apparatus, can have a safety control therein that automatically shuts down the apparatus when the access door is inadvertently opened. An override on the safety control allows the access door to be opened to allow servicing.

While the turbine washing system has been described with reference to obtaining the wash water from air at the site of the turbine, the washing system can also obtain the wash water from other known water producing means off site, provided cost is not a factor. The washing system can, for example, employ reverse osmosis apparatus or desalinization apparatus for providing clean water. The water producing means can be enhanced with water treating means, such as filters, to provide extremely clean water from the clean water. Deionizers can treat the extremely clean water from the filters to provide ultra clean water. Delivery means are provided to feed the ultra clean water to turbine washing apparatus to clean the blades of the turbines on-line.

The turbine washing method comprises obtaining clean water from known water producing means, treating the clean water, preferably by filtering, to provide extremely clean water, and deionizing the extremely clean water to provide ultra clean water. The ultra clean water is then directed to a turbine, onto the turbine blades, to wash the blades while the turbine is operating on-line. The clean water can be treated to provide extremely clean water having a conductivity of less than 3 microsiemens/cm and preferably approaching 1 microsiemens/cm. The extremely clean water can be treated by deionizing to provide ultra pure water having a conductivity of less than 1 microsiemens/cm and preferably approaching 0.2 microsiemens/cm.

The invention claimed is:

1. A turbine washing system having:
a turbine site having at least one turbine;
a first component comprising: a water making apparatus at the turbine site near the turbine, the water making apparatus extracting water from air; the water making apparatus having: filtering and purifying means for filtering and purifying the extracted water to provide extremely clean water having a conductivity of less than 3 microsiemen/cm; and a holding tank in which the extremely clean water is stored over time until needed, the holding tank being at least large enough to wash turbine blades once;
deionizing means selectively receiving the extremely clean water from the holding tank as needed and delivering ultra clean water having a conductivity of less than 1 microsiemen/cm; and
a second component comprising a water delivery system directly connected to the deionizing means, the water delivery system receiving the ultra clean water and directing it as a liquid to the turbine during delivery and directly onto the turbine blades for a short period of time to wash the turbine blades while the turbine is on-line.

2. A washing system as claimed in claim 1 wherein the water making apparatus has an air filter and an air purifier for filtering and purifying the air from which the water is extracted.

3. A washing system as claimed in claim 1 wherein the water making apparatus has an air duct with fan means moving the air through the duct and at least two water removing systems; each water removing system having a compressor, an evaporator, and a condenser, the at least two evaporators mounted in the duct one behind the other for cooling the air in stages to condense water onto a surface of at least the second evaporator; collectors for collecting the condensed water off the evaporators and directing it to the holding tank; the water delivery system connected to the holding tank; air filtering and purifying means at an entrance to the duct for filtering and purifying the entering air, the filtering and purifying means filtering and purifying the water entering the holding tank.

4. A washing system as claimed in claim 3 including a heat pipe in the water making apparatus, the heat pipe having a chilling end located in front of one evaporator and a heating end behind another evaporator.

5. A washing system as claimed in claim 3 wherein the air filtering and purifying means include mechanical filter means for taking particles out of the air and chemical filter means for removing chemical compounds from the air.

6. A washing system as claimed in claim 3 wherein the water filtering and purifying means include mechanical filter means for removing sediment from the water; UV filter means for eliminating live organics from the water; and carbon filter means for removing other contaminants from the water.

7. A washing system as claimed in claim 3 wherein the evaporators, water collectors and holding tank are made from stainless steel.

8. A washing system as claimed in claim 3, wherein in at least one of the water removing systems, means are provided for selectively directing refrigerant from the evaporator in the one water removing system on its return to the compressor in the one water removing system, through the holding tank to cool the water therein.

9. A washing system as claimed in claim 8 including a temperature sensor in the holding tank, the sensor connected to a controller which operates valves to direct the refrigerant to the holding tank on its way to the compressor in the one water removing system.

10. A washing system as claimed in claim 3 including means directing excess water from either the water collectors or the holding tank to at least one collection trough, and by-pass lines for selectively passing hot refrigerant from one of the water removing systems through the water in the trough to cool the refrigerant prior to its entering the evaporator in the one water removing system.

11. A washing system as claimed in claim 3 including a cross-flow air-to-air heat exchanger inserted in the duct in front of the evaporators, the duct arranged to have the air in the duct pass through the heat exchanger to the evaporators and to have the air from the evaporators pass through the heat exchanger to cool the air entering the evaporators.

12. A washing system as claimed in claim 3 wherein the air duct has a first section and a second adjacent section serially joined to the first section with the air flowing in one direction in the first section and in the opposite direction in the second section; a rotary heat exchange wheel in both the first and second sections with one half of the wheel in the first section and the other half of the wheel in the second section, the evaporators located in the duct behind the one half of the wheel in the first section and in front of the other half of the wheel in the second section to have the cooler air leaving the evaporators cool the other half of the wheel which then rotates into the first section to pre-cool the air entering the evaporators.

13. A washing system as claimed in claim 4 including baffle means in the duct in front of the heat pipe for selectively directing air over the heat pipe.

14. A washing system as claimed in claim 3, wherein in at least one of the water removing systems, means selectively directing the refrigerant from the compressor in the one water removing system, on its way to the evaporator in the one water removing system, through the holding tank to heat the water therein.

15. A washing system as claimed in claim 3 wherein the duct is separate from the rest of the water making apparatus.

16. An apparatus as claimed in claim 1, wherein the water delivery system includes a wash tank, water feeding means for moving water from the holding tank to the wash tank through the deionizing means, and spray nozzles connected to the wash tank to spray the water directly onto the turbine blades.

17. An apparatus as claimed in claim 16 wherein the wash tank has a size equal to the amount of water needed to wash the turbine once, and water moving means is connected to the wash tank for moving the wash water out of the wash tank and out through the nozzles to wash the turbine.

18. An apparatus as claimed in claim 17 wherein the water moving means is operated after washing to purge the wash tank, the nozzles and the portion of the water delivery means between the wash tank and the nozzles.

\* \* \* \* \*